United States Patent
Ziegler

[15] 3,675,521
[45] July 11, 1972

[54] ARTICLE TRIMMER

[72] Inventor: William E. Ziegler, Ann Arbor, Mich.

[73] Assignee: Hoover Ball and Bearing Company, Saline, Mich.

[22] Filed: May 28, 1970

[21] Appl. No.: 41,272

[52] U.S. Cl. ........................................................82/101
[51] Int. Cl. ...................................B23b 3/04, B23b 5/14
[58] Field of Search...........................82/46, 101, 102, 85, 47

[56] References Cited

UNITED STATES PATENTS

| | | | |
|---|---|---|---|
| 2,321,735 | 6/1943 | Clifford | 82/101 X |
| 3,084,578 | 4/1963 | Hartford | 82/101 X |
| 2,232,021 | 2/1941 | Calleson et al. | 82/85 X |
| 1,934,660 | 11/1933 | Fairchild | 82/101 |
| 2,298,366 | 10/1942 | Gladfelter et al. | 82/101 X |
| 3,470,774 | 10/1969 | Phelps | 82/101 X |
| 3,481,232 | 12/1969 | Yann | 82/101 X |
| 3,481,233 | 12/1969 | Yann et al. | 82/101 X |
| 3,406,598 | 10/1968 | Doucet | 82/46 |

FOREIGN PATENTS OR APPLICATIONS

| | | | |
|---|---|---|---|
| 652,725 | 11/1962 | Canada | 82/101 |

*Primary Examiner*—Harrison L. Hinson
*Attorney*—Olsen and Stephenson

[57] ABSTRACT

Apparatus for trimming the flash from the necks of molded hollow plastic articles. The flash on the upper end of each of the articles is formed to define a dome having an annular groove coaxial with the neck of the article. Stationary guide means and movable guide means penetrate the grooves in the domes so as to transport the articles while simultaneously rotating them about their axes. A cutting tool is provided for severing the flash from the rotating article. Carrier means are provided for translating the articles in upright positions from a loading station to the trimming station and from the trimming station of an unloading station.

18 Claims, 8 Drawing Figures

FIG. 3

INVENTOR
WILLIAM E. ZIEGLER

INVENTOR
WILLIAM E. ZIEGLER
BY Olsen and Stephenson
ATTORNEYS

FIG. 8

INVENTOR
WILLIAM E. ZIEGLER

ARTICLE TRIMMER

BACKGROUND OF THE INVENTION

The present invention relates to an apparatus for trimming flash sequentially from the necks of blown plastic containers.

Various arrangements have been suggested for automatically trimming flash from blow molded hollow articles or containers. Normally, it is desired that the trimming operation be performed by apparatus which receives the blown hollow articles directly from the blow molding machine. It is common practice to carry out blow molding operations wherein a number of articles are blown simultaneously in a single molding machine, and when this is done it is particularly necessary that the trimming apparatus be adapted to accommodate all of the hollow articles being discharged by the molding machine so as not to slow down or interfere with the molding operation.

One of the arrangements which has been suggested for trimming flash from the necks of hollow plastic articles is disclosed in U.S. Pat. No. 3,429,211, issued Feb. 25, 1969 to Pelot. This patent discloses trimming apparatus adapted to be used with hollow plastic articles wherein the necks of the articles must all include annular grooves into which stationary and movable guide means of the trimming apparatus must be fitted. This arrangement has some very useful features, but it also leaves much to be desired. Initially, this arrangement seriously restricts the bottle designer in the selection of the bottle designs that he can employ because the neck of the bottle must always be shaped substantially the same to fit the trimming apparatus. Also, while this arrangement eliminates some of the manual operations previously required when deflashing, it is not readily susceptible to use in a completely automated system.

SUMMARY OF THE INVENTION

The present invention has overcome the shortcomings of the prior art and has provided apparatus for trimming the flash from the necks of blown plastic containers at a rate corresponding to the rate which the blown plastic containers are delivered from the blow molding machine to the trimming apparatus. Also, the apparatus is constructed and arranged so that there is no requirement that the necks of the containers be standardized to fit the trimming apparatus.

According to one form of the present invention, apparatus is provided for trimming the flash from the necks of blown plastic articles as they move along a path of travel, the flash being formed on each article to define a dome having an annular groove coaxial with the neck of the article. Stationary guide means and a movable guide means extend along the path of travel for engagement of the grooved portion of each said dome so as to transport the articles along the path while simultaneously rotating them about their own axes. Carrier means are provided which loosely enclose the articles and are movable at the rate the articles are transported so as not to inhibit their rotation while maintaining the articles in alignment. Cutting means are associated with the stationary guide means to cut the domes from the necks of the bottles as they are rotated. Chute means are provided in association with the blow molding apparatus for receiving the blown articles from the molds of the blow molding machine and for guiding them into the carrier means which are adapted to move from the loading station to the trimming station, and thereafter from the trimming station to a discharge station. The latter includes an elevator which can receive the trimmed articles from the carrier means and can lower them to a level from which they can be transferred onto a conveyor. The carrier means travel in an endless path so that after discharge at the elevator, the carrier means can be returned to the loading station at the chute means for receiving the untrimmed articles from the blow molding machine. Two sets of sleeve members are provided as parts of the carrier means for performing the function of enclosing the articles, and such sleeve members are spaced so that one set is at the loading station for receiving untrimmed articles while the other set is at the unloading station for discharging trimmed articles.

Thus, it is an object of the present invention to provide improved trimming apparatus for removing flash from the necks of molded hollow plastic articles.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The trimmer or trimming apparatus 10 is designed for use with a conventional blow molding machine having aligned molds 12, only one of which is shown, for blow molding simultaneously a plurality of hollow containers or articles 14. The trimming apparatus 10 is designed especially for trimming the flash from the necks of the hollow containers. The trimming apparatus 10 requires the containers 14 to be free of all other flash, including the tails which are the unused portion of a parison which extends below the mold cavity. To remove the tails while the containers are still in the mold 12, a suitable cutter or wiper (not shown) may be employed as a part of each mold so that the cutters may be passed across the mold parting line, severing the tails from the bodies of the containers. The tails may then fall to the chute means 16 for disposition to a waste system.

Figure 7:
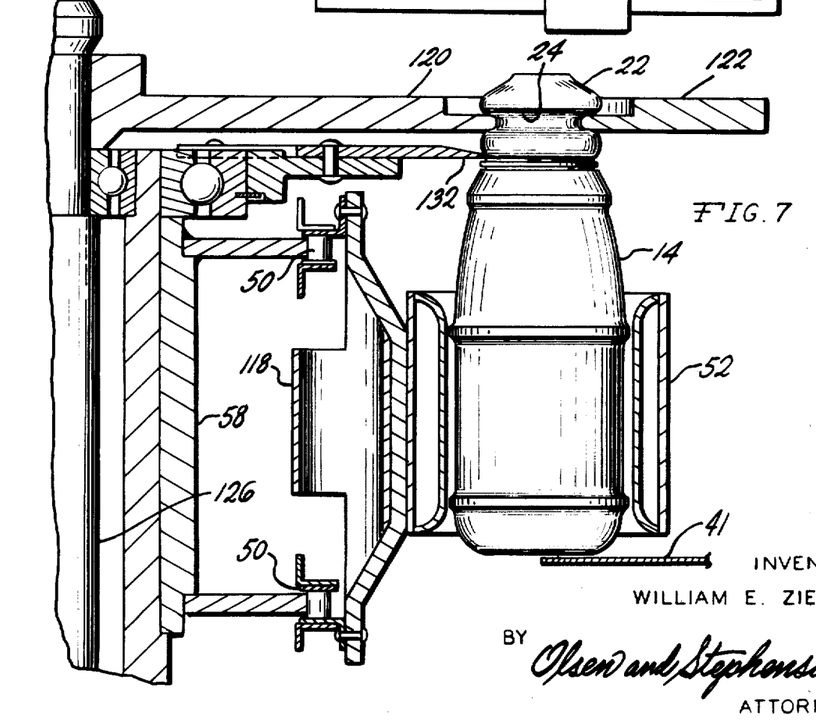
FIG. 7 is an enlarged fragmentary section taken on the line 7—7 of FIG. 6.

The molds 12 are designed to have a dome cavity portion 18 above the neck portion of the container forming portion 20 so that when the parison is blown to the shape of the mold cavity, an untrimmed article will be formed to the shape shown in FIG. 7 wherein flash above the neck of the container defines the dome 22 having an annular groove 24 coaxial with the neck of the article 14. The portion 26 of the mold 12 can be constructed as a separate section of the mold 12 so that it can be used with any mold having a cavity 20 for forming hollow articles so that a standard sized dome with an annular groove can be blown and subsequently trimmed from the remainder of the body of such hollow article by utilizing the trimming apparatus 10.

The chute means 16 is mounted on the blow molding machine so as to be located beneath the molds 12 and is constructed and arranged so that it may be in either of two positions. In one position, shown in solid lines in FIG. 3, it will guide sheared tails into a waste disposal system, and in the other position, in which the chute in effect is open, it will guide the finished containers into a first loading station of the trimmer apparatus.

The chute means 16 comprise a front chute member 28 and a rear chute member 30, and includes a plurality of fore and aft panels 32 between each of the aligned molds 12. The front chute member 28, to which the panels 32 are affixed, is pivotally mounted on the pin 34 and has its upper end inserted under the bracket 36 so that when the molds 12 move from their closed position, shown in solid lines, to their open positions, shown in broken lines, the bracket 36 will pivot the front chute member to the position shown in broken lines. At the same time the rear chute member 30 which is pivotally mounted on the pin 38 will be moved by the air cylinder 40 to the broken line position shown in FIG. 3.

The air cylinder 40 is controlled by a single solenoid, spring offset, four-way valve (not shown). When the valve is energized, the rear chute member 30 is in the "scrap" position or solid line position shown in FIG. 3 so that scrap released from the molds 12 can be directed by the rear chute member 30 to the scrap system. When the valve is de-energized, the rear chute member 30 will return to the "trimmer" position or broken line position shown in FIG. 3.

In automatic cycle, the chute valve (not shown) is energized at the instant the molds 12 close. The chute member 30 is transferred to the "scrap" position and remains there until after the tails have been sheared, dropping to the surface of the rear chute member 30 where they can slide into a waste system. After this, the controls for the air cylinder 40 will cause the latter to be actuated to move the rear chute member 30 to the "trimmer" position so that the blown containers are accepted therein when they are ejected from the molds 12.

Figure 1:
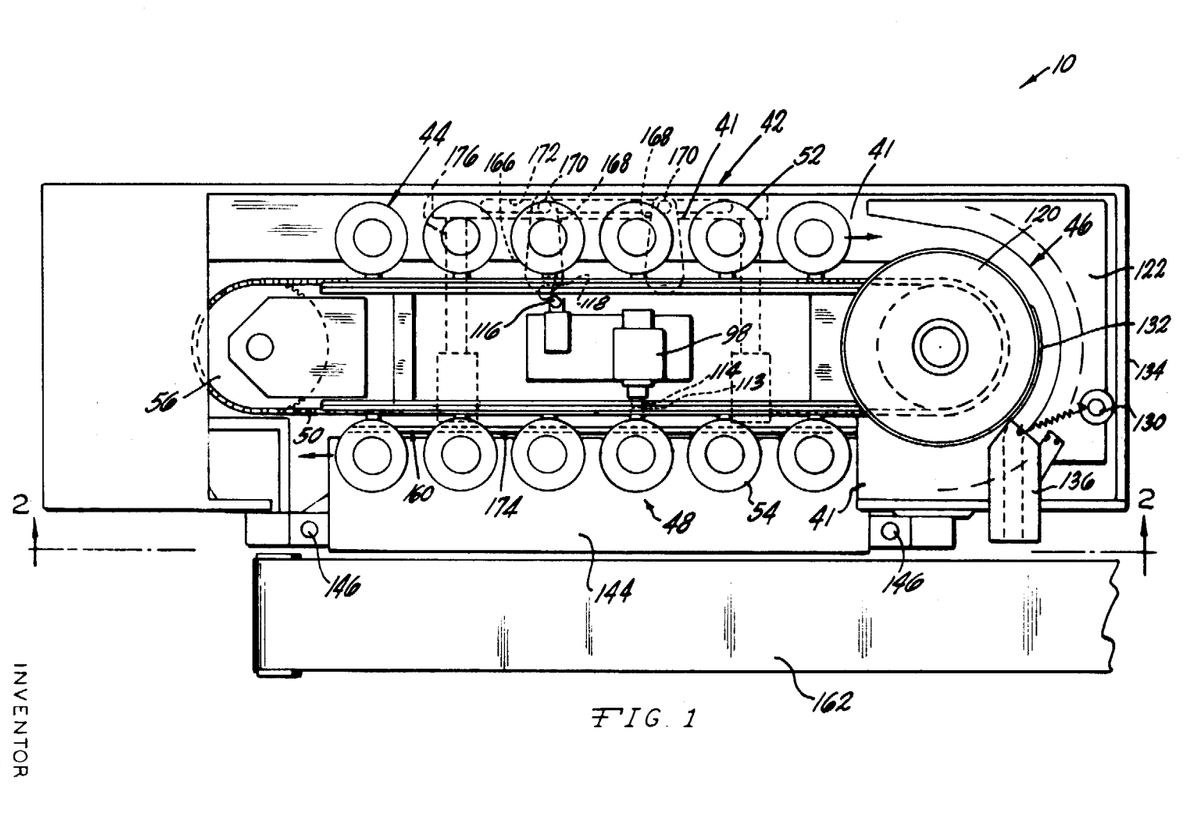
FIG. 1 is a top plan view of trimming apparatus embodying the invention with portions removed to illustrate the path of travel of plastic articles and showing the sleeve members at the loading and unloading stations.
Figures 4, 5:
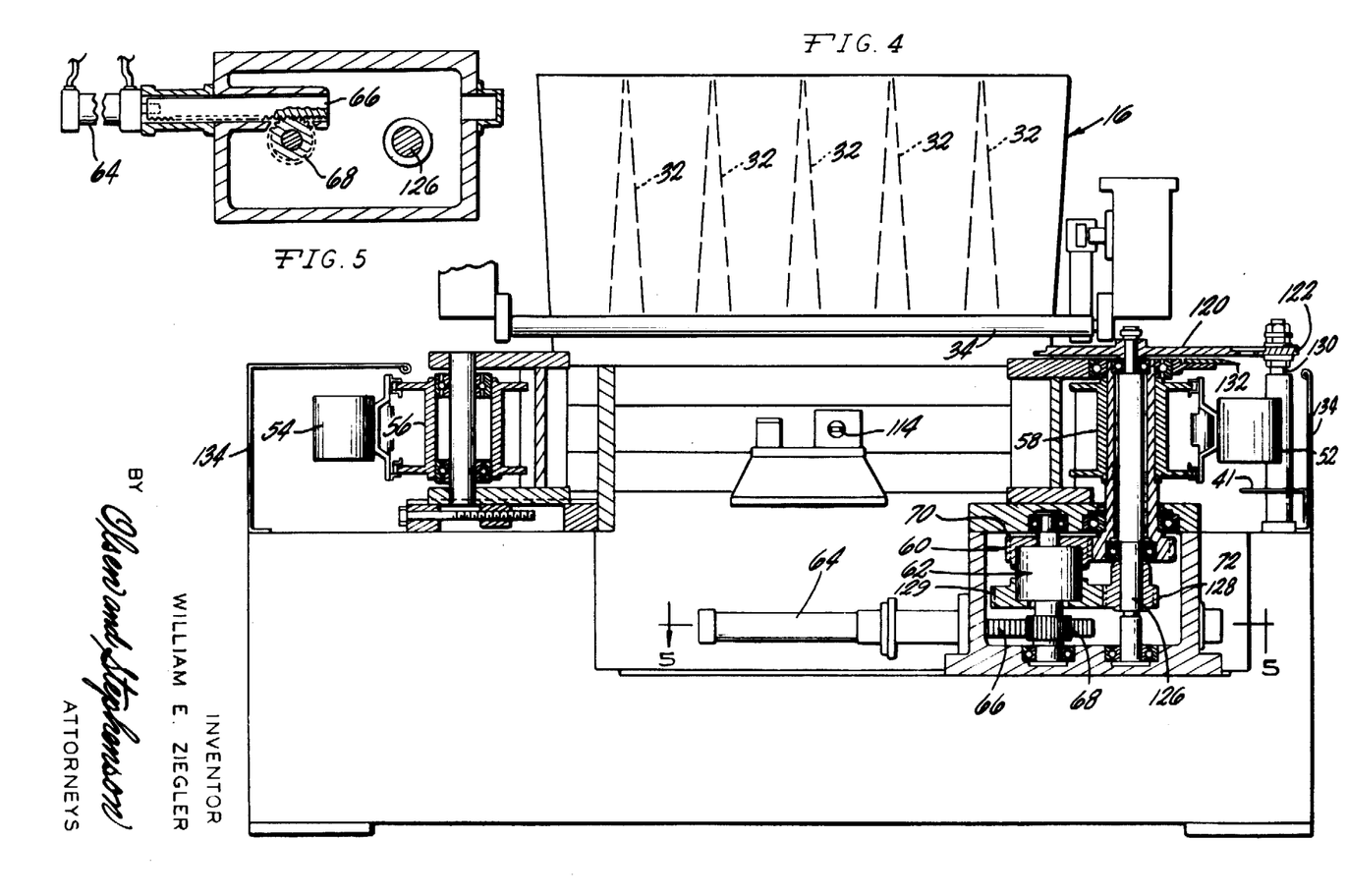
FIG. 4 is a sectional view showing details of the carrier means and illustrating one set of sleeve members at the trimming station.
FIG. 5 is a fragmentary section taken on the lines 5—5 of FIG. 4.
Figure 6:
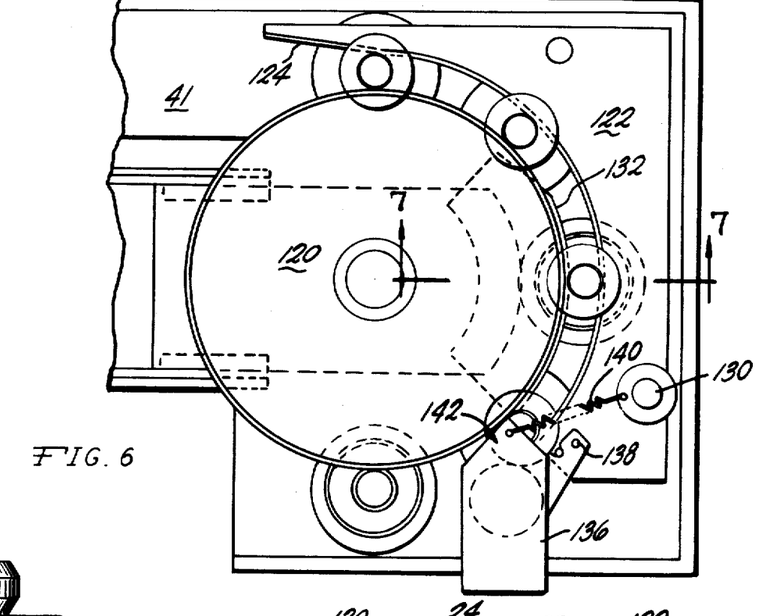
FIG. 6 is a fragmentary top plan view showing hollow trimmed articles being moved through the trimming station of the article trimmer.

The articles 14 which are delivered through the chute means 16 are deposited in a vertical or upright position on a tray 41 at a first or loading station 42 where they are translated by a carrier means 44 through an intermediate or trimming station 46 to a second or unloading station 48. The carrier means 44 comprises two chains 50 to which are attached two sets of open-end buckets or sleeve members 52, 54. The quantity of buckets or sleeve members in each set is equal to the number of die heads (not shown) or molds 12 on the blow molding machine. The two chains 50 are wrapped around two double sprockets 56 and 58 to form two endless parallel loops. The sprocket 56 is an idler, while the sprocket 58 is driven through a gear train 60 and a one-way clutch 62 by a hydraulic cylinder 64. As shown in FIG. 5, the rod of the cylinder 64 is connected to the rack 66 which is in driving engagement with the pinion 68 so that expansion and contraction of the cylinder 64 will cause pinion 68 to be rotated in either a clockwise or counterclockwise direction. The one-way clutch 62 is operable to turn the gear 70 in one direction but not in the other direction of rotation of pinion 68. Thus, the hollow shaft 72 which has its end in mesh with the gear 70 will rotate the sprocket 58 which is mounted thereon only in response to movement of the hydraulic cylinder 64 in one direction. The stroke of the cylinder 64 and the gearing ratio combine to provide a total chain travel of slightly more than one half the length of the chain 50. Thus, each time the cylinder 64 is advanced, the two sets of buckets or sleeve members 52 and 54 trade places. The front set 54 in FIG. 1, which is empty, moves around the outer sprocket 56 to the rear position beneath the molds 12. The rear set of buckets or sleeve members 52, as seen in FIG. 1, each carrying a molded container, moves around the driving sprocket 58 to the second position at the unloading station 48, and the containers 14 are severed from their domes 22 as they pass around the 180° bend, as will presently be described. Because of the one-way clutch 62, the cylinder 64 then retracts by itself without moving the chains 50.

Figure 8:
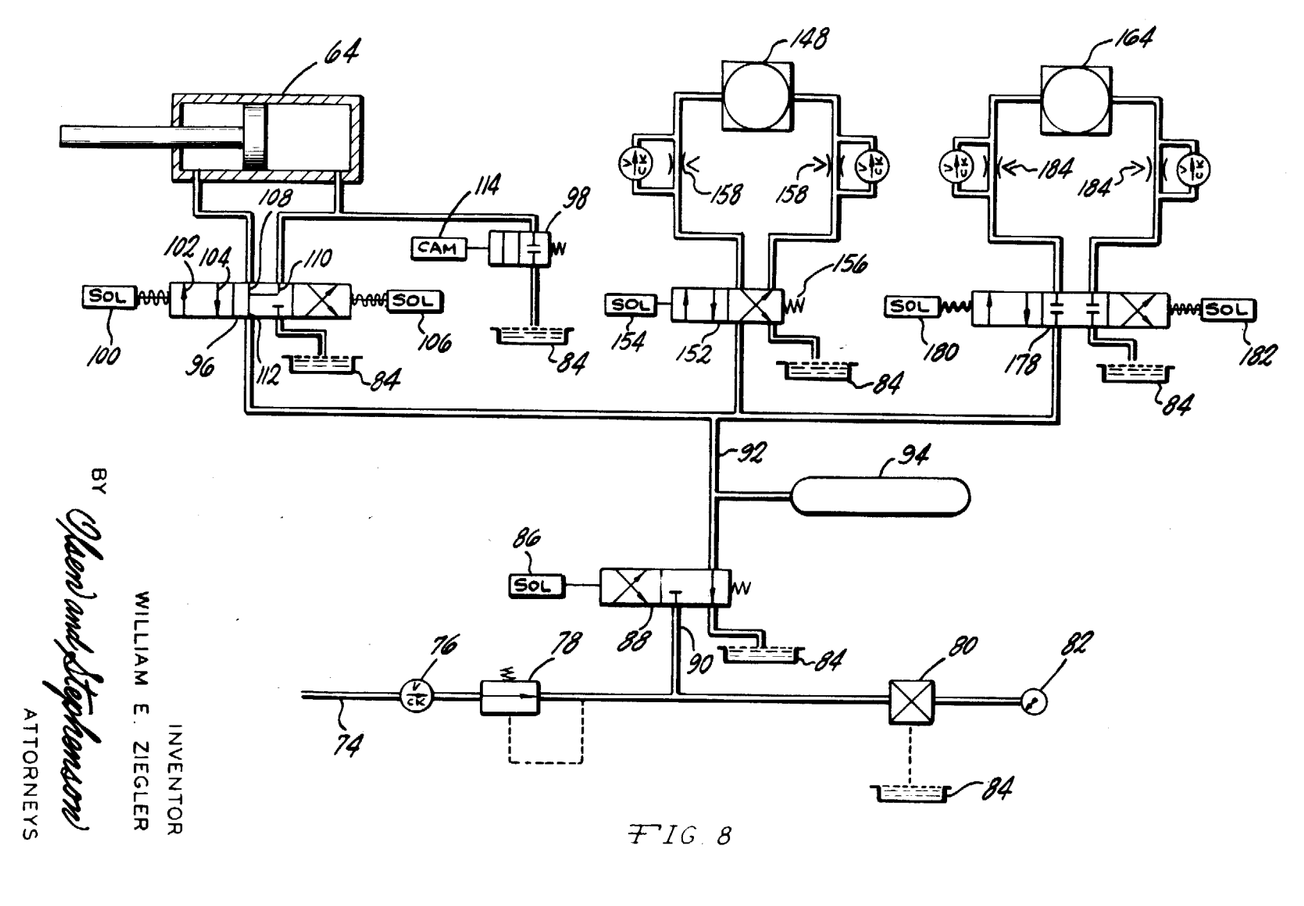
FIG. 8 is a schematic diagram of the hydraulic system for actuating the various components of the article trimmer.

With partial reference to FIG. 8, the hydraulic system for control of the indexing cylinder 64 will now be described. As is shown in FIG. 8, a pressure line 74 is provided which may be in communication with the hydraulic pump of the blow molding machine. The pressure line 74 includes a check valve 76, a pressure regulator 78, an isolator valve 80 and a pressure gauge 82. When the trimming apparatus 10 is to be operated automatically, the solenoid 86 will be energized to move the spool of the valve 88 to the right to a position to place a line 90 in communication with line 92 which contains the accumulator 94 for maintaining uniform pressure to the hydraulic fluid supplied to the trimming apparatus.

The control of the indexing cylinder 64 is achieved through the use of a three-position, double solenoid, four-way valve 96 and a cam operated valve 98 which is in communication with line 92 and index cylinder 64. When retracting the cylinder 64, the four-way valve 96 controls in the conventional manner; that is, solenoid 100 is energized, and pressure is applied to the rod end of the cylinder 64 through one port 102 while the other port 104 is open to the reservoir 84 allowing oil to escape from the cap end of the cylinder 64. The cam valve 98 is completely out of the circuit at this time, and at any time that either solenoid associated with the valve 96 is energized. To advance the cylinder 64, the opposite solenoid 106 is energized momentarily and then released, allowing the spool of the valve 96 to assume its centered position illustrated in FIG. 8. In this position, the spool configuration is such that both cylinder ports 108 and 110 and the pressure port 112 are connected together. In this manner, equal pressure is applied to both ends of the cylinder 64. Since the area of the cap end of the cylinder 64 is greater than the rod end, the effective force on the cylinder becomes equal to the applied pressure in pounds per square inch multiplied by the cross sectional area of the piston rod, and the rod begins to extend out from the cylinder. As it extends, the oil being forced out of the rod end returns to the valve 96, where it is met by the oil flowing into the valve from the pressure source or pump. Since the two pressures are essentially equal, these two flows combine and take the only available path open to the path end of the cylinder. Thus, a differential circuit is developed and the piston rod advances at a rate equal to the sum of the two flow rates, one from the pump and the other from the rod end.

As the cylinder 64 and the chain 50 approach the desired position, a cam 113 on the chain contacts the roller 114, FIG. 1, and begins to depress it. As the valve 98 is depressed farther and farther, more and more oil is diverted from the cylinder 64 and allowed to flow through the cam valve 98 to the source 84, slowing the travel rate of the hydraulic cylinder 64 and the chain 50. When the flow rate through this valve 98 is sufficient to create a pressure drop across the valve that is exactly equal to the differential pressure between the two ends of the cylinder 64, the movement of the piston in cylinder 64 stops. This system provides deceleration as well as precise positioning for the buckets or cylindrical members 52 and 54 under the molds 12. The chain 50 will have moved exactly one half its total length, as the piston in the hydraulic cylinder 64 will have traveled a little less than its full stroke. Thus, the piston does not bottom in the cylinder, but is controlled entirely by the cam operated valve 98.

Limit switch 116, FIG. 1, is actuated at about the same time as the cam 114 and its valve 98. When tripped by element 118 on chain 50, it is adapted to energize solenoid 100 to return the cylinder 64 to its normal position. If this were to occur too soon, the cylinder 64 would reverse before reaching the cam 114, and the buckets or sleeve members 52, 54 would be out of position. To eliminate this possibility and also to avoid the necessity of very critical adjustments, a timed delay period is provided between the actuation of the limit switch 116 and the reversal of the cylinder 64. This is accomplished by suitable timer means, (not shown) which should be set as short as possible without interferring with positioning accuracy for just enough time to assure that the valve 98 has controlled the movements in the desired manner. Upon expiration of the delay period, the cylinder 64 will then be retracted.

The articles 14 which are delivered through the chute means 16 are deposited in a vertical or upright position on the tray 41 within the sleeve members 52 or 54, and when the latter are moved by the indexing assembly the articles 14 will slide on the surface of the tray 41 until the sleeve members 52 enter the trimming station 46. At this station, the articles 14 will be elevated a small amount so as to be spaced above the tray 41 as shown in FIG. 7. This occurs because the movable guide means 120 and the stationary guide means 122 are located a pre-established distance above the tray 41 and when the articles 14 are advanced between these guide means 120, 122 by movements of the sleeve members 52, the annular grooves 24 engage the peripheries of the guide means 120, 122 at the throat 124 where they are elevated a slight amount during complete penetration of the guide means into the annular grooves 24.

As shown best in FIGS. 4 and 7, the movable guide means 120 is a drive wheel which is connected to the drive shaft 126. Mounted on the drive shaft 126 is the gear 128 which is in mesh with the gear 129 that is driven by the one-way clutch 62. Thus, the drive shaft 126 will rotate the movable guide means 120 only in response to movement of the hydraulic cylinder 64 in one direction, and this will occur at the same time that the sets of buckets or sleeve members 52 and 54 are being moved. During this time, the stationary guide means 122 remains motionless, being held partly by the support post 130. Also mounted in a stationary position is the curved knife 132 so that it is in the path of travel of the articles 14.

Thus, the articles 14 which are captivated in the sleeve members 52 or 54 are driven around the sprocket 58 during which time the domes 22 are severed from the articles 14. This is accomplished by each article 14 being rotated about its axis within its sleeve member while it is moving across the length of the curved knife 132. The radii and the rate of turning of the sprocket 58 and the connected movable guide means 120 which engages the dome in the annular groove 24 and causes it to rotate with respect to the knife 132, are carefully calculated to match the article rotational speed with that of the chain movement. This assures alignment with the moving sleeve members 52, 54 as the entire assembly progresses around the curve. As indicated, the driving wheel or movable guide means 120 is powered by the same cylinder 64 as the chains 50, but rotates at a different speed, determined by the ratio of each gear train 128, 129 as compared with the ratio of the gear train 72, 60.

In the illustrated embodiment, the peripheral edges of the movable guide means 120 and the stationary guide means 122 are knurled to provide desired traction to assure positive rotation of the articles 14 about their axes. Other suitable surfaces for providing desired traction may be utilized. It is also to be understood that the tray 41 is vertically adjustable with respect to the guard panel 134 so that articles of different sizes can be trimmed merely by adjusting the location of the tray 41 so that the annular grooves 24 of the articles 14 will be penetrated by the movable and stationary guide means 120, 122.

After the domes 22 have been severed from the body of the article 14, they are captured by the dome track 136 for discharge to a waste system. Preferably, the dome track 136 is pivotally mounted at 138 to the stationary guide means 122 and is anchored in place by the anchor spring 140 which extends between the stationary post 130, and the inlet end 142 of the dome track 136. This arrangement permits pivotal movement of the dome track 136 about the pin 138 for the purpose of freeing the track in the event jamming of severed domes should occur.

Figure 2:
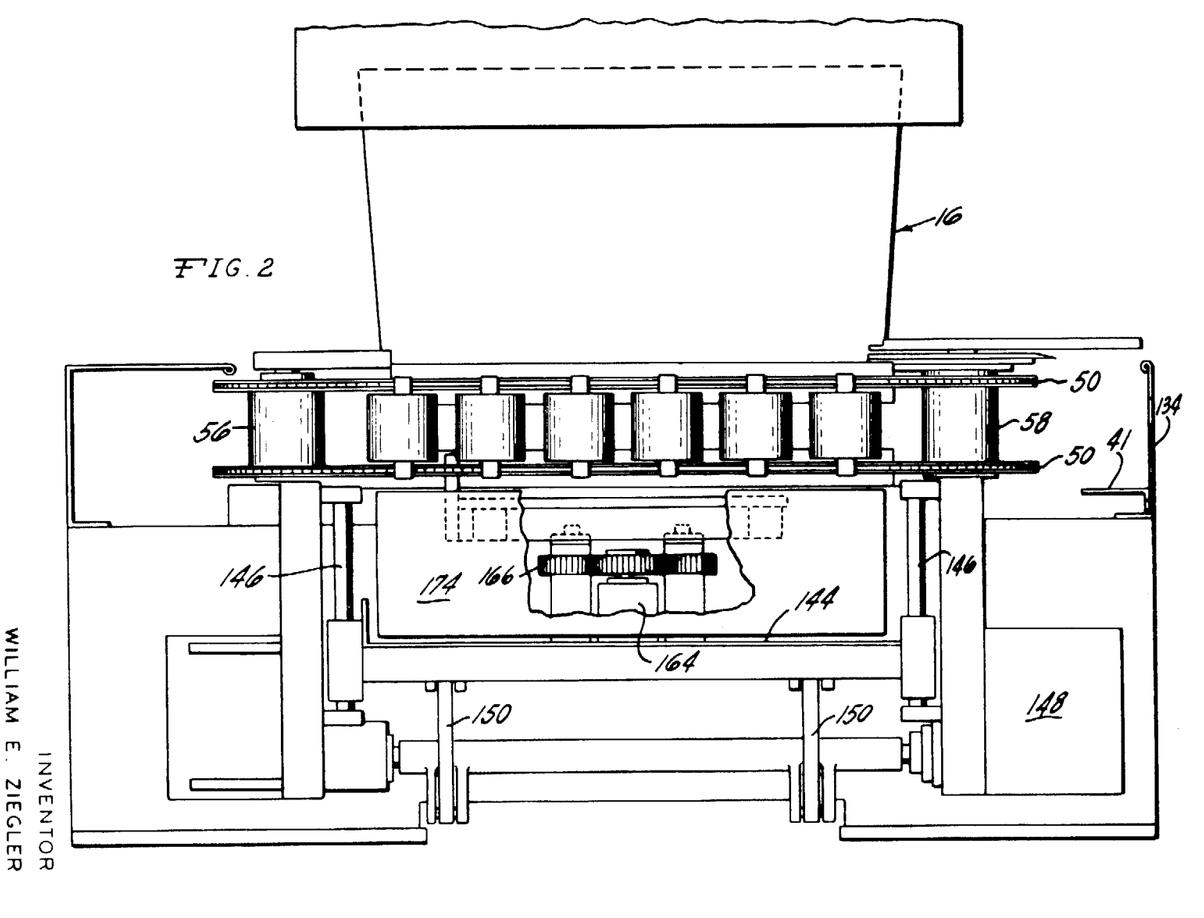
FIG. 2 is a front elevational view of the trimming apparatus with portions removed for purposes of illustration.
Figure 3:
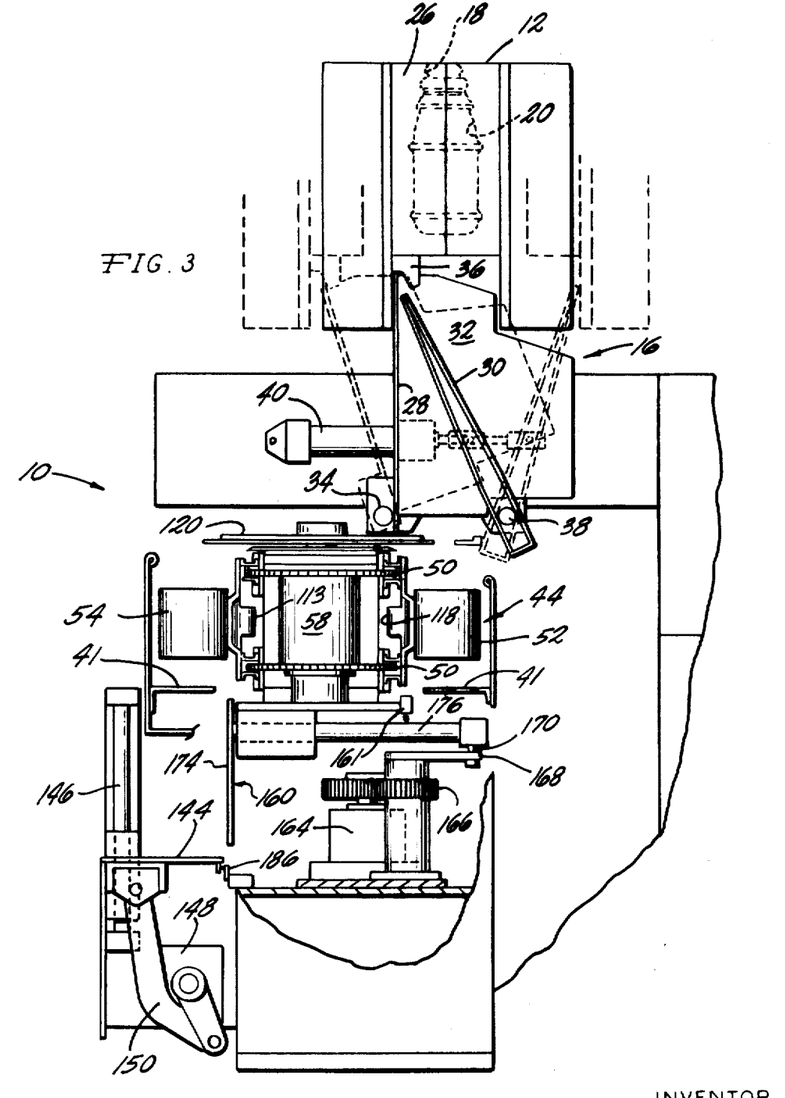
FIG. 3 is a side elevational view showing portions of the molding apparatus with which the trimming apparatus is adapted to be used, the molds being shown in solid lines in a closed position, and in broken lines in an open position with associated parts of the chute means also shown in two positions by solid and broken lines.

After the articles 14 have been trimmed, they come to rest on a flat top elevator 144 which then moves vertically to lower the articles 14 from their sleeve members. In FIGS. 2 and 3, the elevator 144 is shown in its lowermost position, and when in its elevated position it will be substantially flush or slightly below the level of the tray 41 so that the trimmed articles being moved by the sleeve members 52, 54 can slide from the tray 41 directly onto the flat surface of the elevator 144. As previously indicated, when the one set of sleeve members 52 is at the loading station 42 for receiving untrimmed articles from the chute means 16, the other set 54 will be at the unloading station 48 for depositing the trimmed articles onto the elevator 144.

The elevator 144 includes the stationary elevator guide rods 146, and movement of the upper surface of the elevator 144 is accomplished by means of a hydraulic rotary actuator through a connecting linkage 150 which translates the rotary motion into a linear motion.

With partial reference to FIG. 8, a brief description of the control of the movement of the elevator 144 will now be given. Control is accomplished by the use of a single solenoid, spring offset, four-way valve 152. When energized, the solenoid 154 shifts the spool of the valve 152 to a position that allows oil to flow under pressure to one side of the rotary actuator 148. The opposite side of the actuator 148 is then opened to the source 84. When solenoid 154 is de-energized, the self-contained spring 156 returns the spool of the valve 152 to its original position, applying pressure to the opposite side of the actuator 148. Flow controls 158 are located adjacent to the valve 152 to provide speed adjustment for both the upward and downward movements of the elevator 144.

Provided in association with the elevator 144 is a pusher means 160 for displacing the articles 14 from the elevator 144 when the latter is in its lowermost position. Because of this arrangement, proper timing between the operation of the elevator 144 and the pusher means 160 is required. The solenoid 154 of the valve 152 is energized to raise the elevator 144 when the pusher means 160 has moved to its retracted position to actuate the limit switch 161, FIG. 3. The solenoid 154 is de-energized, lowering the elevator 144 when the carrier means 44 has positioned a new group of articles 14 on the elevator 144. Since the pusher means 160 and the elevator 144 operate in the same area, they are interlocked through limit switches to prevent accidental interference with each other. The pusher means must be retracted before the elevator 144 is allowed to raise, and the elevator must be lowered before the pusher means 160 is allowed to extend.

Because of the inherent instability of free standing, empty containers, it is desirable that they not be subjected to any sudden or irregular movements unless they are firmly held by some means during their movement. Since it is often desired that the containers be transferred from the elevator 144 directly to a conveyor such as is shown at 162, the pusher means 160 is actuated in such a way so as to provide smooth and uniform acceleration control, both positive and negative. This control is achieved by utilizing a hydraulic powered rotary actuator 164, coupled through gears 166 to two rotating arms 168. Each arm has a cam follower 170 which rolls in a groove or track 172 that is perpendicular to the desired line of movement. As the arms 168 rotate through 360°, the track 172 coupled to the pusher plate 174 through guide bars 176 accelerates smoothly on a sine curve from zero velocity to maximum velocity, then decelerates smoothly to zero velocity at its extended position, then accelerates to maximum as the pusher plate 174 is retracting, decelerating to zero velocity when fully retracted. Thus, one full rotation of the rotating arms 168, provides a complete extension and retraction of the pusher plate 174. The arms 168 cannot rotate more than 360° so that it becomes necessary to reverse the direction of the rotation during the next cycle. During one cycle the pusher means 160 extends and retracts as the actuator 164 is rotating clockwise, and during the next cycle, the pusher means 160 extends and retracts as the actuator 164 is rotating counterclockwise.

Referring again in part to FIG. 8, the controls for operating the pusher means 160 will be described. A double solenoid, spring centered, four-way valve 178 is utilized to control the pusher means 160. When the solenoid 180 is energized, the actuator 164 rotates clockwise, and when the solenoid 182 is energized, the actuator 164 rotates counterclockwise. If neither solenoid is energized, the spool of the valve 178 is centered, and no movement is possible. This circuit also provides flow control means 184 for controlling the rate of movement in both directions of the pusher means 160.

The pusher means 160 becomes energized when the elevator 144 actuates a limit switch 186 in the downward position of elevator 144 and remains energized until the elevator 144 raises, releasing the limit switch 186. As previously indicated the elevator 144 and the pusher means 160 are interlocked through other limit switches, to preclude the possibility of interference.

From the foregoing description it will be apparent that a trimmer has been provided for receiving a plurality of blown hollow articles directly from a blow molding machine and for trimming the flash from the necks of the articles sequentially and transferring such trimmed articles to a conveyor in an upright position for further disposition.

It is claimed:

1. Apparatus for trimming in series the flash from the necks of blown plastic articles as they move along a path of travel, wherein said flash has been formed on each article to define a dome having an annular groove coaxial with the neck of the article, comprising a stationary guide means and a movable guide means extending along said path of travel for engagement between them of the grooved portion of each said dome so as to transport said articles along said path while simultaneously rotating them about their own axes, carrier means for loosely enclosing said articles so as not to inhibit their rotation while maintaining their alignment and drivingly interconnected with said movable guide means so as to be movable at the rate said articles are transported by said movable guide means, and cutting means associated with said stationary guide means to cut the domes from the necks of the articles as they are rotated.

2. Apparatus that is defined in claim 1, wherein said carrier means is mounted for movement in a fixed path that defines said path of travel, said stationary guide means and said movable guide means are located along a downstream portion of said fixed path, and said carrier means is movable along said fixed path for moving articles with flash to said portion of the fixed path.

3. Apparatus that is defined in claim 1, wherein said carrier means is mounted for movement in a fixed path that defines said path of travel, said stationary guide means and said movable guide means are located along an intermediate portion of said fixed path, and said carrier means is movable along the entire length of said fixed path for moving articles with flash to said intermediate portion and for moving trimmed articles from said intermediate portion.

4. Apparatus that is defined in claim 3, wherein a tray is located along said fixed path and is positioned so that it supports articles with flash that are moved by said carrier means to said intermediate portion.

5. Apparatus that is defined in claim 4, wherein said stationary guide means and said movable guide means are arranged to penetrate said groove in the dome and to support the article above said tray until the flash has been trimmed from the article.

6. Apparatus that is defined in claim 4, wherein said carrier means encloses the untrimmed articles in a position on said tray so that said axes are vertical.

7. Apparatus that is defined in claim 6, wherein said stationary and movable guide means are horizontally spaced for receiving said grooved portions, said tray being located a preselected distance below said guide means so that when said guide means penetrate said grooved portions the articles will be elevated an amount sufficient to be disengaged from said tray until the flash has been trimmed from the article.

8. Apparatus that is defined in claim 7, wherein said tray is mounted for vertical adjustment relative to said guide means.

9. Apparatus that is defined in claim 4, wherein an elevator on which said trimmed articles can be deposited forms an extension of said tray downstream of said intermediate portion, said elevator being operable to lower trimmed articles from said carrier means when the latter is stationary.

10. Apparatus that is defined in claim 9, wherein pusher means are operably associated with said elevator for displacing trimmed articles from said elevator when the latter is in its lower position.

11. Apparatus that is defined in claim 4, wherein chute means are located above said fixed path for receiving articles discharged from the partible molds of a blow molding machine and to deliver the received articles into said carrier means.

12. Apparatus that is defined in claim 11, wherein said chute means is responsive to parting of the molds to open so as to receive the articles discharged from the molds and to close when the partible molds are closed.

13. Apparatus that is defined in claim 1, wherein said carrier means includes a plurality of sleeve members for enclosing said articles and is mounted for movement in a fixed path that defines said path of travel, and an indexing assembly for initially moving said plurality of sleeve members from a stationary position at a first station at the upstream end of said fixed path to a second stationary position at a second station at the downstream end of said fixed path.

14. Apparatus that is defined in claim 13, wherein said indexing assembly is operable after a time delay to return said plurality of sleeve members from said second station to said first station.

15. Apparatus that is defined in claim 14, wherein said indexing assembly includes an endless chain on which said sleeve members are mounted.

16. Apparatus that is defined in claim 15, wherein at least two sets of sleeve members are mounted in spaced relation on said endless chain, one set being at said first station when the second set is at said second station.

17. Apparatus that is defined in claim 16, wherein said first station includes chute means for introducing untrimmed articles into said sleeve members and said second station includes an elevator for lowering trimmed articles from said sleeve members.

18. Apparatus that is defined in claim 17, wherein said second station includes a pusher means for displacing trimmed articles from said elevator at its lowered position.

* * * * *